(12) United States Patent
Kim

(10) Patent No.: US 8,487,870 B1
(45) Date of Patent: *Jul. 16, 2013

(54) PORTABLE DEVICE AND CONTROL METHOD THEREOF

(71) Applicant: LG Electronics Inc., Seoul (KR)

(72) Inventor: Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,997

(22) Filed: Oct. 10, 2012

Related U.S. Application Data

(63) Continuation of application No. 13/587,641, filed on Aug. 16, 2012, which is a continuation of application No. 13/458,212, filed on Apr. 27, 2012, now Pat. No. 8,269,719.

(60) Provisional application No. 61/606,468, filed on Mar. 4, 2012.

(51) Int. Cl.
*G09G 5/00* (2006.01)

(52) U.S. Cl.
USPC ............ 345/156; 345/169; 345/173; 715/773

(58) Field of Classification Search
USPC .................. 345/156, 169, 173; 715/221, 222, 715/226, 235, 236, 238, 239, 243, 249, 740, 715/743, 753
See application file for complete search history.

(56) References Cited

U.S. PATENT DOCUMENTS

| | | | |
|---|---|---|---|
| 7,627,648 B1 | 12/2009 | Mehta et al. | |
| 2003/0025678 A1 | 2/2003 | Lee et al. | |
| 2005/0005234 A1* | 1/2005 | Chen ............................ | 715/508 |
| 2007/0229465 A1 | 10/2007 | Sakai et al. | |
| 2008/0273015 A1* | 11/2008 | Huang et al. ................... | 345/173 |
| 2009/0231493 A1* | 9/2009 | Baalbergen et al. ........... | 348/734 |
| 2009/0278860 A1 | 11/2009 | Hines et al. | |
| 2010/0134385 A1 | 6/2010 | Roth et al. | |
| 2011/0084919 A1 | 4/2011 | Lee | |
| 2011/0267291 A1 | 11/2011 | Choi et al. | |
| 2012/0089946 A1 | 4/2012 | Fukui | |

FOREIGN PATENT DOCUMENTS

| | | |
|---|---|---|
| JP | 2010-182002 A | 8/2010 |
| KR | 10-2007-0111592 A | 11/2007 |

* cited by examiner

*Primary Examiner* — Koosha Sharifi-Tafreshi
(74) *Attorney, Agent, or Firm* — Birch, Stewart, Kolasch & Birch, LLP

(57) ABSTRACT

A display device and method for receiving a user input of the display device, are discussed. According to an embodiment, the method can include displaying a displayable content which includes at least one input box; receiving a control signal corresponding to a navigating input from a portable device, wherein the portable device is connected with the display device and the navigating input is for navigating the displayable content; transmitting the input box to the portable device, wherein the input box is displayed in the portable device when a user input for mode switching is detected by the portable device and the input box is extracted from the displayable content; and receiving a user input from the portable device wherein the user input is inputted in the transmitted input box.

20 Claims, 11 Drawing Sheets

(a)

Scroll down (b)

(a)

Scroll down (b)

(a)

Scroll down (b)

FIG. 5

(a-1) Username [          ]
      Passwork [          ]

(a-2) [ Username ]
      [ Passwork ]

(a-3) Phone No. [   ] - [   ] - [        ]

(b) Country [            ▽]

(c) ● Yes        ○ Yes
    ○ I Agree   ● I disagree (d) ☑ Stay signed in
    ☐ Remember ID (e) ( Agree )    ( Disagree )

(a)

Triggering

Scroll down (b)

(a)　Triggering

Scroll down (b)

(a) (b)

(c) (d)

(a)

(b)

PORTABLE DEVICE AND CONTROL METHOD THEREOF

This application is a Continuation of co-pending application Ser. No. 13/587,641 filed on Aug. 16, 2012, which in turn is a continuation of U.S. application Ser. No. 13/458,212, filed Apr. 27, 2012 (now U.S. Pat. No. 8,269,719, issued Sep. 18, 2012), which claims the benefit of U.S. Provisional Application No. 61/606,468, filed on Mar. 4, 2012. The entire contents of all of the above applications are hereby incorporated by reference.

BACKGROUND OF THE INVENTION

1. Field of the Invention

The present invention relates to portable devices, and more particularly, to a portable device which is capable of communicating with an external device and a control method thereof.

2. Discussion of the Related Art

When a user uses electronic devices, mobility has been an important issue. Recently, a variety of portable devices having performance corresponding to a desktop computer as well as cellular phones have been on sale. A user can use electronic information while in motion as the devices decrease in size and weight.

In addition to a basic function such as data transmission and reception, the portable devices perform various functions, thereby increasing use thereof. Especially, users use portable devices having high mobility to control other electronic devices. To this end, technology for providing a convenient user interface is needed.

SUMMARY OF THE INVENTION

Accordingly, the present invention is directed to a portable device which can more conveniently and accurately transmit and receive user input and a method for transmitting and receiving user input. Especially, the present invention provides a convenient user interface to a user when a portable device receives user input and transmits user input to an external device under a circumstance in which the portable device is connected to the external device.

In an aspect of the present invention, a method for transmitting user input of a portable device includes detecting navigating input in a navigation mode for controlling an external device which is connected by a network, wherein the external device displays displayable content and the navigating input is for navigating the displayable content which includes at least one input box, transmitting a control signal corresponding to the detected navigating input to the external device, displaying an indicator which indicates capability of mode switching from the navigation mode to a user input mode, initiating the user input mode by displaying the input box which is extracted from the displayable content when user input for mode switching is detected, and transmitting user input which is received through the displayed input box.

The method may further include terminating the user input mode when the user input for the displayed input box is transmitted, and switching back to the navigation mode.

The user input for mode switching may include touch screen input, stylus input, hardware button input, gesture recognition, image recognition and voice recognition.

The method may further include displaying terminating interface for terminating the user input mode, and terminating the user input mode when user input to the terminating interface is detected.

In the method, initiating the user input mode may further include determining priority of the each input box, wherein the priority depends on the position of the input box in the displayable content, and displaying the input box sequentially corresponding to the determined priority.

The priority further may depend on whether the input box is displayed on the external device.

The displayed input box may be extracted from the displayed area of the displayable content.

The displayed input box may further be extracted from non-displayed area of the displayable content.

In the method, initiating the user input mode may further include displaying a virtual keyboard with the input box as input means.

In the method, transmitting user input may further include displaying transmitting interface for transmitting user input which is received through plurality of input box groups, wherein each input box group includes related input boxes and the input box groups are mutually independent, and transmitting the user input which is received through the plurality of input box groups when user input to the transmitting interface is detected.

In another aspect of the present invention, a device for transmitting user input includes a sensor unit configured to detect user input, a communications unit configured to communicate with an external device, and a controller in control of the above units, configured to perform actions including detecting navigating input in a navigation mode for controlling the external device which is connected by a network, wherein the external device displays displayable content and the navigating input is for navigating the displayable content which includes at least one input box, transmitting a control signal corresponding to the detected navigating input to the external device, displaying an indicator which indicates capability of mode switching from the navigation mode to a user input mode, initiating the user input mode by displaying the input box which is extracted from the displayable content when user input for mode switching is detected, and transmitting user input which is received through the displayed input box.

The actions may further include terminating the user input mode when the user input for the displayed input box is transmitted, and switching back to the navigation mode.

The user input for mode switching may include touch screen input, stylus input, hardware button input, gesture recognition, image recognition and voice recognition.

The actions may further include displaying terminating interface for terminating the user input mode, and terminating the user input mode when user input to the terminating interface is detected.

In the device, initiating the user input mode may further include determining priority of the each input box, wherein the priority depends on the position of the input box in the displayable content, and displaying the input box sequentially corresponding to the determined priority.

The priority further may depend on whether the input box is displayed on the external device.

The displayed input box may be extracted from the displayed area of the displayable content.

The displayed input box may further be extracted from non-displayed area of the displayable content.

In the device, transmitting user input may further include displaying transmitting interface for transmitting user input which is received through plurality of input box groups, wherein each input box group includes related input boxes and the input box groups are mutually independent, and transmitting the user input which is received through the plurality of input box groups when user input to the transmitting interface is detected.

In a further aspect of the present invention, a method for transmitting user input of a portable device includes detecting navigating input in a navigation mode for controlling an external device which is connected by a network, wherein the external device displays displayable content and the navigating input is for navigating the displayable content which includes at least one input box, transmitting a control signal corresponding to the detected navigating input to the external device, switching from the navigation mode to a user input mode by displaying the input box which is extracted from the displayable content when user input for mode switching is detected, and transmitting user input which is received through the displayed input box.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 1A and 1B are diagrams showing webpages displayed on an external device according to an exemplary embodiment of the present invention.

FIGS. 5A-1 to 5E are diagrams showing examples of input interfaces according to an exemplary embodiment of the present invention.

DETAILED DESCRIPTION OF THE INVENTION

Figure 1:
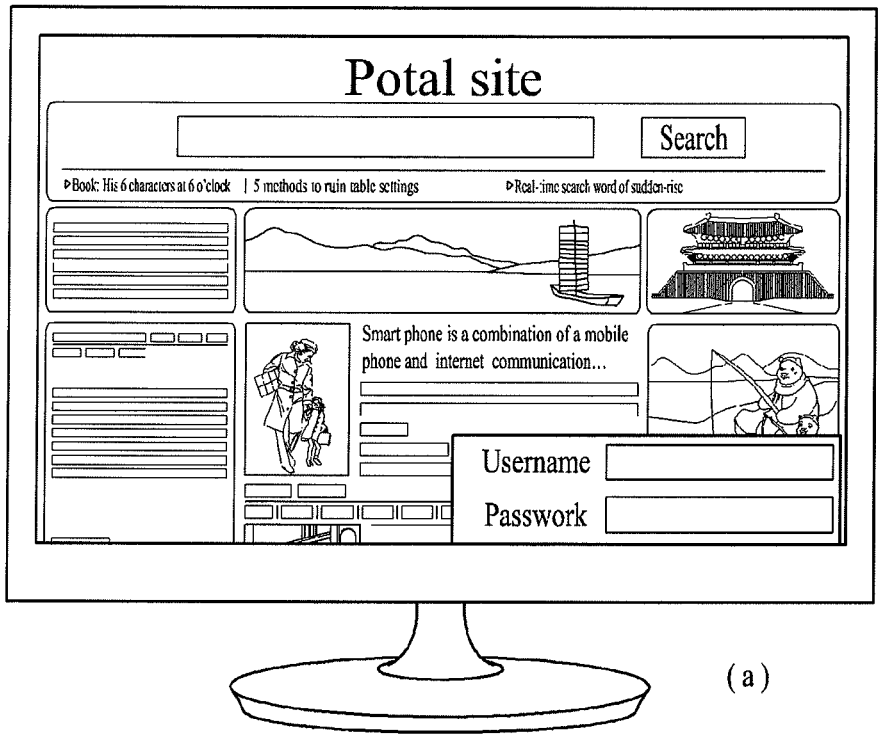
Figure 1:
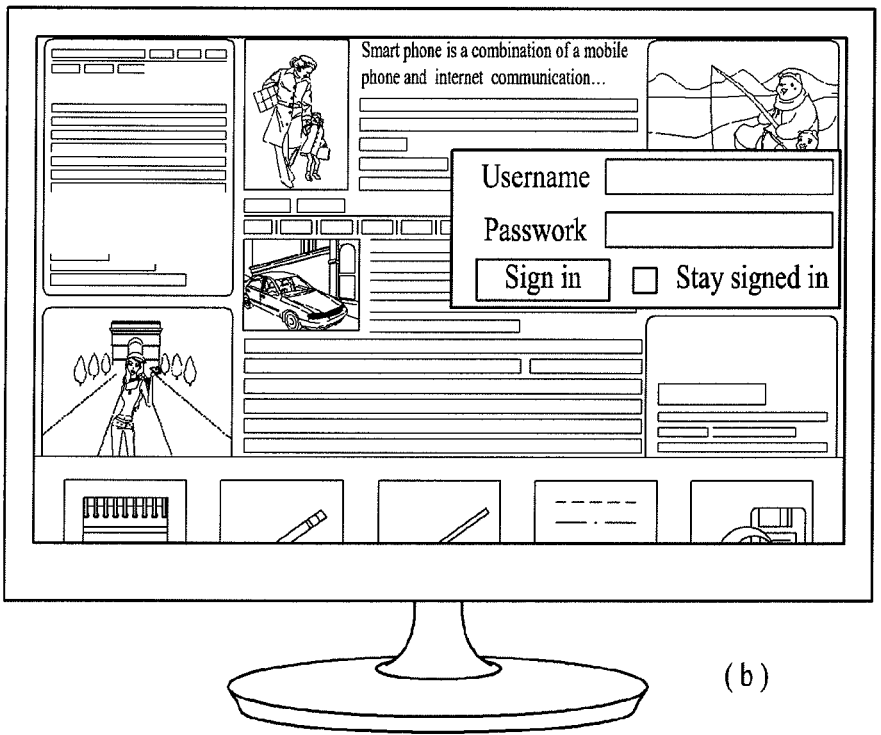

Reference will now be made in detail to the preferred embodiments of the present invention, examples of which are illustrated in the accompanying drawings. Wherever possible, the same reference numbers will be used throughout the drawings to refer to the same or like parts.

FIGS. 1A and 1B are diagrams showing webpages displayed on an external device according to an exemplary embodiment of the present invention.

The webpage displayed on the external device may include input interfaces for receiving user input. An input interface may be defined as an interface through which the device can receive user input such as characters, numerals, symbols, etc. or receive user selection such as a mouse click, a touch input, a remote controller input, etc. For example, the input interface may include a text input box in which a user can input specific text, a radio button which can select one of a plurality of entities, a checkbox which can check selection, a selection button which can execute a specific command, and a select list box which can perform selective input among a plurality of lists. The input interface may further include information about the aforementioned input box or buttons. For instance, the input interface may include information corresponding to the title of the text input box. Hereinafter, the input interface may be referred to as an input box and a detailed description thereof will be given later.

In FIG. 1A, a display of the external device may display a 'Search' text input box in which words to be searched are input, and 'Username' and 'Password' text input boxes in which an ID and a password are input.

The input interfaces included on the webpage may be distributed in some separate regions on the webpage rather than in a partial region. For example, the 'Search' text input box may be located in an upper part of the webpage and the 'Username' and 'Password', text input boxes may be located in a right lower part of the webpage as shown in FIG. 1A. Then it is inconvenient to input text because a user should move a pointer and then click a text input box in order to input text in the corresponding text input box.

Further, since the display of the external device can display only a limited area, the content of a single webpage may not be simultaneously displayed. Accordingly, a user should use an upper/lower or left/right scroll bar in order to use the content of an area which is not displayed. That is, a situation may occur in which some input interfaces included in a corresponding webpage are not displayed and are displayed only through an upper/lower or left/right scroll operation. Such a case is shown in FIG. 1B.

As shown in FIG. 1B, a 'Sign in' input button and a 'Stay signed in' checkbox related to the 'Username' and 'Password' text input boxes are displayed on the external device only after a user scrolls down the webpage. Accordingly, in order to select a 'Stay signed in' option or to sign in after inputting information in the 'Username' and 'Password' text input boxes, the case may occur in which a user should scroll down the webpage and then click the 'Stay signed in' checkbox or the 'Sign in' input button.

Moreover, if an input interface which has been displayed is moved to an area which is not displayed on the external device due to a scroll-down operation, a situation may occur in which the external device cannot receive user input for the corresponding input interface. For example, in FIG. 1B, the 'Search' text input box is not displayed any longer on a screen. Accordingly, the external device cannot receive an input in the 'Search' text input box in the displayed webpage as shown in FIG. 1B and a screen scroll operation should be performed to receive an input in the 'Search' text input box.

Figure 2:
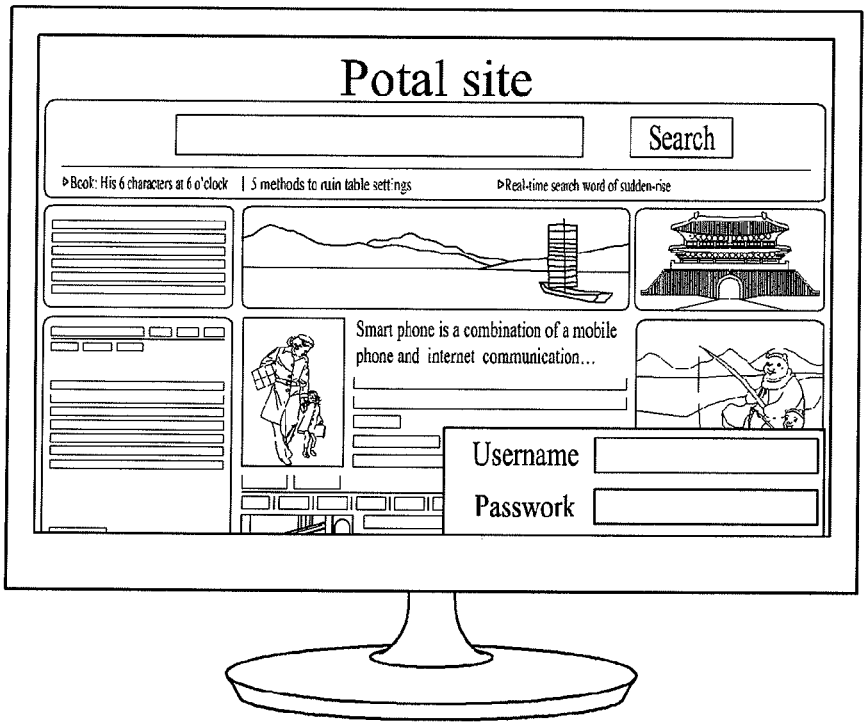
FIG. 2 is a diagram showing a display data sharing operation between an external device and a portable device according to an exemplary embodiment of the present invention.
Figure 2:
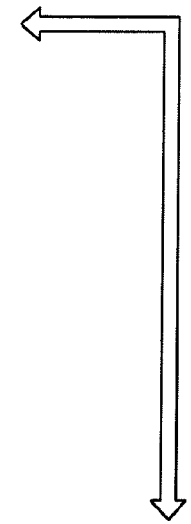
Figure 2:
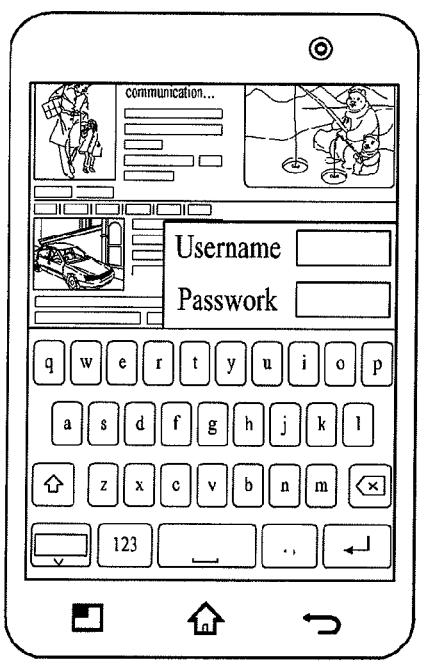
Figure 2:
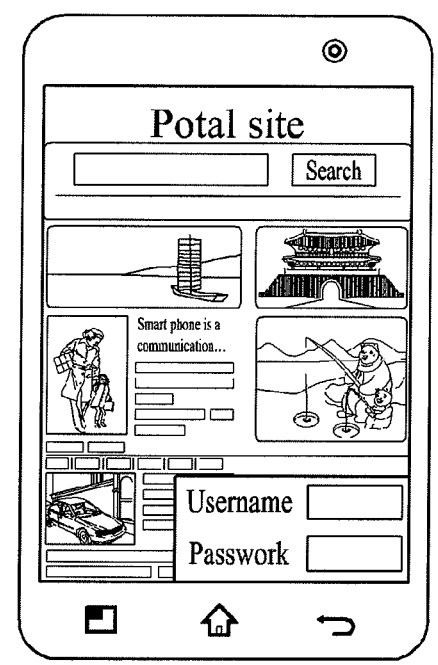

FIG. 2 is a diagram showing a display data sharing operation between an external device and a portable device according to an exemplary embodiment of the present invention.

An external device 11 may transmit data related to a screen (hereinafter, referred to as screen data) which is being displayed to a portable device 13 which is connected thereto by wire or wirelessly. The portable device 13 receives and displays the screen data on a display so that displayable content displayed on the external device 11 can be provided to a user through the display of the portable device 13.

The displayable content on the external device 11 includes content usable online and content usable offline. For example, the displayable content may include Internet content and intranet content which are connected online and include at least one input interface. In addition, the displayable content may include video content, multimedia content, etc. usable online or offline. Although content does not include an input interface, if the input interface is included in a program or application for activating the corresponding content, the content may be displayable content. Hereinafter, a webpage will be described as an embodiment of the displayable content but the range of the present invention is not limited thereto.

The external device 11 refers to a device connected to the portable device 13 to transmit and receive data and may include a device having a display function, such as a television, a monitor, a projector, etc. The external device 11 may also include another portable device connected to the portable device 13.

As shown in FIG. 2, the portable device 13 may receive data for a display screen of the external device 11 and provide the received data to a user. The portable device 13 is well-equipped with an input tool for user input and a user is also familiar with the input tool. Since the portable device 13 can be carried by a user, it is more frequently used than other external devices. Meanwhile, since user input for the external device is less used than the portable device and an input tool of the external device is limited to a remote controller etc., accuracy and input speed when such an input tool is used may be deteriorated.

Accordingly, it is convenient to use the portable device 13 if it is desired to input specific information while surfing a webpage. The portable device 13 may provide a user with an input interface on a display thereof through transmission and reception of screen data with the external device 11. For example, as shown in FIG. 2, a user should input a username and a password in text input boxes to log in to a specific webpage. In this case, user input can be rapidly and accurately received through the portable device 13 by displaying input interfaces and an input tool rather than through the external device. The portable device 13 may provide a virtual keyboard as an input tool which is capable of inputting text on the displayed input interfaces.

FIGS. 3A and 3B are diagrams showing an input interface display operation of a portable device according to an exemplary embodiment of the present invention.

The portable device 13 may display input interfaces by receiving data of a displayed webpage from the external device 11. The portable device 13 may display the input interfaces, through which a user can input specific text, among the content of a webpage. At this time, the portable device 13 may display both the input interfaces and information corresponding to titles of the input interfaces. In consideration of a display region of the portable device 13, the displayed input interfaces and related information may be enlarged at a given ratio.

FIG. 3A shows an embodiment of displaying input interfaces included in a display region of the external device on the portable device. The portable device 13 may display input interfaces extracted from content displayed on the external device of FIG. 3A. For example, the portable device 13 may display a 'Search' text input box for inputting text to be searched, a 'Search' input button for executing search, and 'Username' and 'Password' text input boxes.

If a screen displayed on the external device 11 is changed, the portable device 13 may display input interfaces corresponding to the changed screen. For example, if a user scrolls down the screen displayed on the external device so that input interfaces such as a 'Sign in' input button and a 'Stay signed in' checkbox are displayed on the external device as shown in FIG. 3B, the portable device 13 may additionally display the above input interfaces.

The portable device 13 may also display input interfaces which are not displayed any longer on the external device 11 due to change of content. In other words, the portable device 13 may display input interfaces which do not appear on a display region of the external device 11 due to a screen scroll operation. Once the input interfaces are displayed on the portable device 13, the portable device 13 may continue to display the input interfaces without deleting the displayed input interfaces.

As described with reference to FIG. 2, the portable device 13 may display the input tool together with the input interfaces. Here, the portable device 13 may display a virtual keyboard as the input tool.

Figure 4:
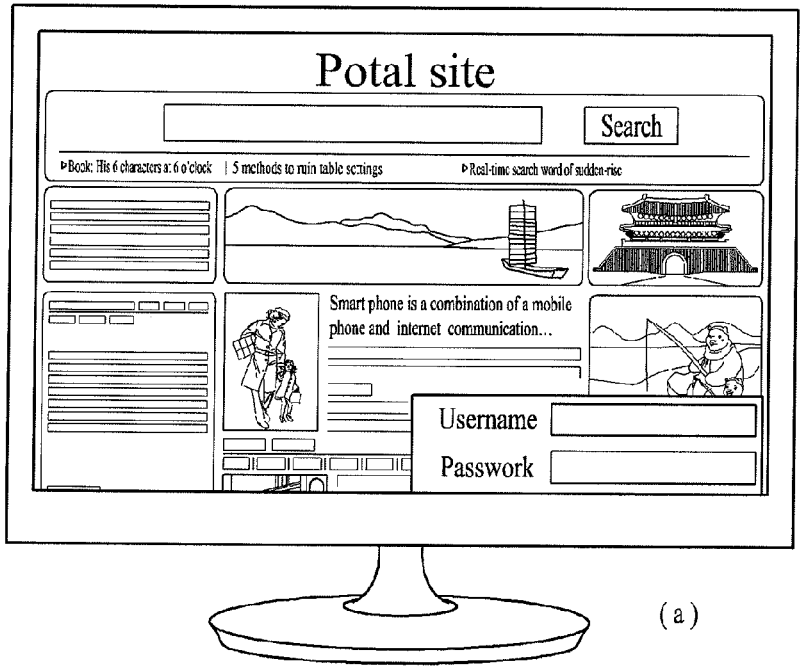
FIGS. 4A and 4B are diagrams showing an input interface display operation of a portable device according to an exemplary embodiment of the present invention.
Figure 4:
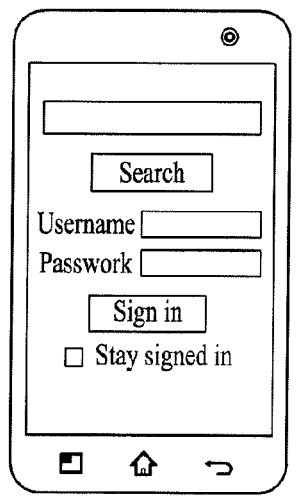
Figure 4:
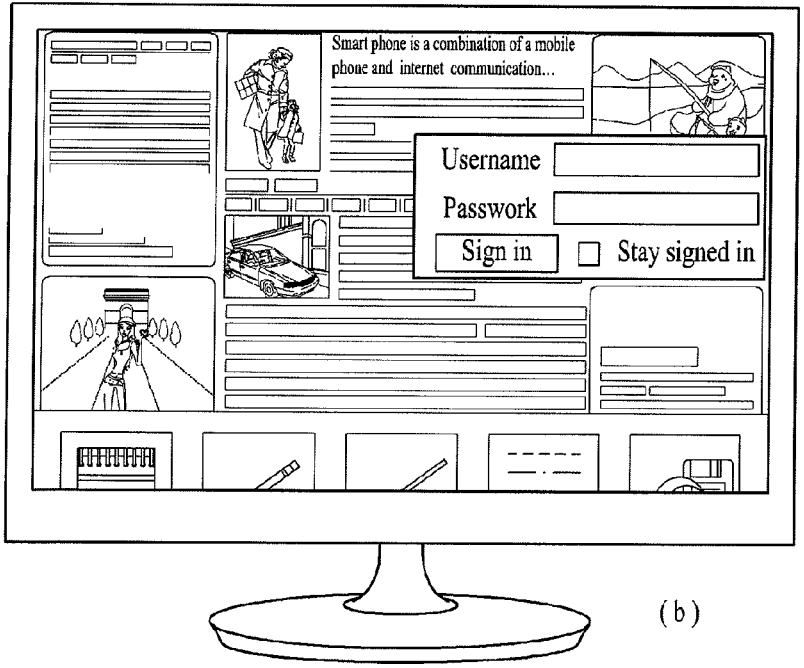
Figure 4:
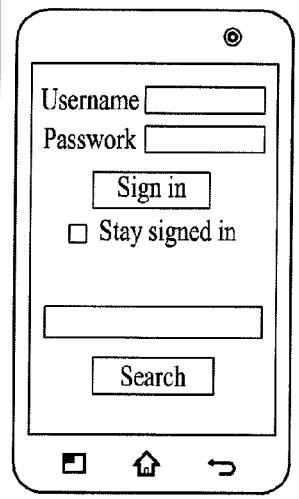

FIGS. 4A and 4B are diagrams showing an input interface display operation of a portable device according to an exemplary embodiment of the present invention.

Referring to FIG. 4A, the external device 11 may display a 'Search' text input box, a 'Search' input button, and 'Username' and 'Password' text input boxes. In FIG. 4B showing a result of scrolling down a screen of the external device 11, a 'Sign in' input button and a 'Stay signed in' checkbox may be additionally displayed on the external device 11.

The portable device 13 according to the present invention may display input interfaces included in a webpage even before a screen of the external device 11 is scrolled. In other words, even though input interfaces which are included in a webpage accessed by the external device 11 do not appear on a display region of the external device 11, the portable device 13 may display the input interfaces on a display thereof. Accordingly, the portable device 13 may provide input interfaces included in a webpage to a user without an additional control operation for display of the external device 11.

For example, even when the external device 11 displays some parts of a webpage as shown in FIG. 4A, the portable device 13 may display the 'Search' text input box, 'Search' input button, 'Username' and 'Password' text input boxes, 'Sign in' input button and 'Stay signed in' checkbox included in the corresponding webpage. Through this, the portable device 13 may provide all input interfaces to a user without an additional scroll operation for the webpage displayed on the external device 11.

The portable device 13 may differentiate input interfaces displayed on the external device 11 from input interfaces which are not displayed on the external device 11 to differently configure regions of the input interfaces displayed on the portable device 13. Further, different priorities may be assigned to input interfaces according to their locations in displayable content displayed on the external device 11. The portable device 13 may assign a first priority to input interfaces which are displayed on the external device 11 and may assign a second priority to input interfaces which are not displayed on the external device 11 so that the respective input interfaces have different priorities. According to such priorities, the portable device 13 may sequentially display the input interfaces.

For example, as shown in FIG. 4B, the portable device 13 may first display input interfaces which are displayed on the external device 11 on a display of the portable device 13 and then display input interfaces which are not displayed on the external device 11.

As described with reference to FIG. 2, the portable device 13 may display an input tool together with the input interfaces. Here, the portable device 13 may display a virtual keyboard as the input tool.

FIGS. 5A-1 to 5E are diagrams showing examples of input interfaces according to an exemplary embodiment of the present invention. FIGS. 5A-1 shows text input boxes and information about the corresponding text input boxes wherein the information is present outside the text input boxes. The information about the text input boxes refers to information explaining the text input boxes and may include, for example, title information of the text input boxes. Upon displaying extracted input interfaces, the portable device 13 may display only the text input boxes or may display both the text input boxes and the information about the text input boxes.

FIGS. 5A-2 shows text input boxes and information about the corresponding text input boxes wherein the information is present inside the text input boxes. Upon displaying extracted input interfaces, the portable device 13 may display only the text input boxes or may display both the text input boxes and the information about the text input boxes.

Figure 3:
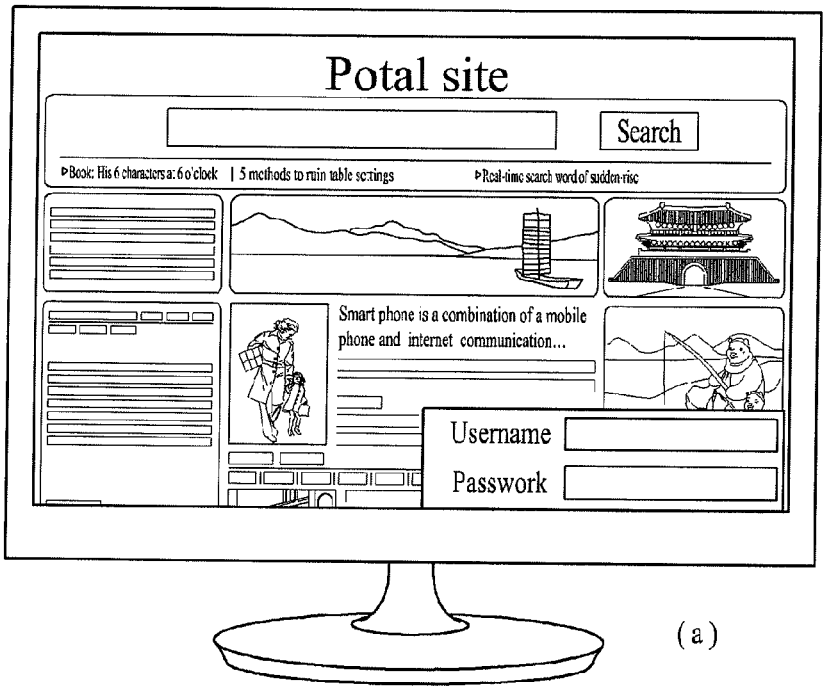
FIGS. 3A and 3B are diagrams showing an input interface display operation of a portable device according to an exemplary embodiment of the present invention.
Figure 3:
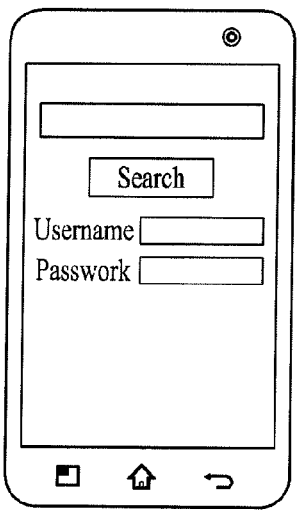
Figure 3:
Figure 3:
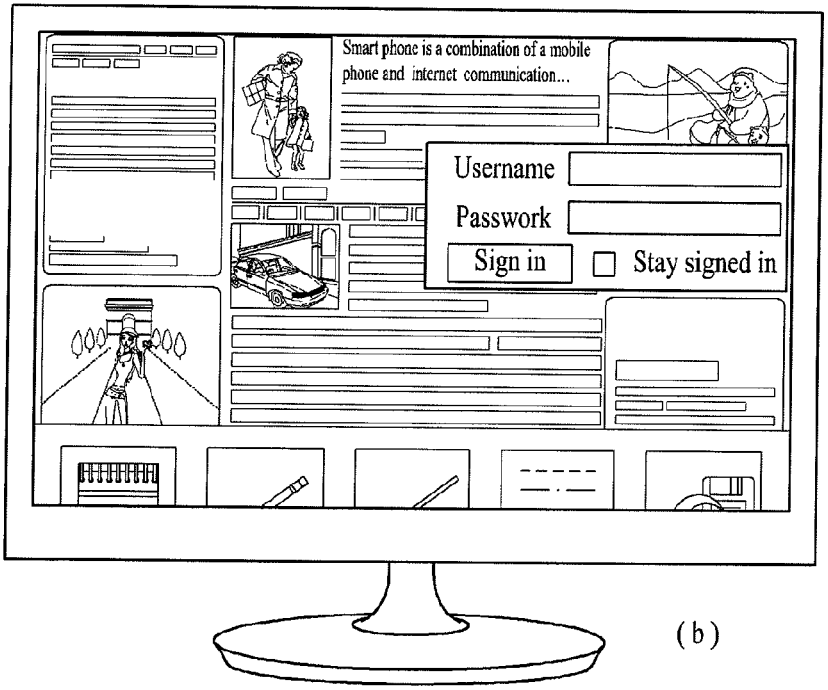
Figure 3:
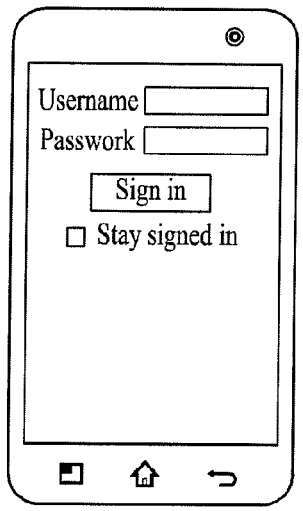

FIGS. 5A-3 shows an input interface including a plurality of text input boxes. For example, when a telephone number or a credit card number is input, a plurality of text input boxes connected with each other by a dash may be used. The portable device 13 may display not only the text input boxes but also information about the text input boxes and dashes.

FIG. 5B shows a select list box among input interfaces. The select list box provides a list which can be selected in the box to a user when the user clicks an arrow in the box, and the user may select a content to be input from the list. Accordingly, the portable device 13 of the present invention may provide a list to a user by extracting and displaying the content of the list. Even in this case, information about the select list box may be displayed together with the select list box. The information about the select list box may be the title of the select list box, for example, 'Country' in FIG. 5B.

FIG. 5C shows radio buttons among input interfaces. When one or more selection items are present, a user can select an item to be input by clicking the radio button. Upon extracting the radio buttons, the portable device 13 may extract and display information about the corresponding button. For example, text information 'Yes', 'No', 'I Agree', 'I Disagree' corresponding to the titles of the radio buttons may be displayed together with the radio buttons, as shown in FIG. 5C.

FIG. 5D shows checkboxes among input interfaces. A checkbox may indicate whether a user selects corresponding content. The portable device 13 may display only the checkboxes or may display information about the checkboxes together with the checkboxes. The portable device 13 may provide the titles of the checkboxes, for example, 'Stay signed in' and 'Remember ID' to a user together with the checkboxes.

FIG. 5E shows input buttons among input interfaces. If a user clicks an input button, an execution command related to the input button may be transmitted. The button may include a text or an image indicating information about the button. The portable device 13 may display a corresponding button and a text or image for the button. As shown in FIG. 5E, one of a plurality of input buttons may be selected. The input button may include an input button for transmitting text input in a text input box to a server managing a webpage. The 'Search' button and the 'Sign in' input button shown in FIGS. 3A and 3B are examples of the input buttons.

As described above, the portable device of the present invention may display the text input boxes, checkboxes, radio buttons, and input buttons. Accordingly, in order to receive user input through input interfaces and transmit the user input to a server managing a corresponding webpage, the portable device may receive an execution command through an input button displayed thereon and may transmit input text, without transmitting a pointer shift control command for the external device.

FIGS. 6A and 6B are diagrams showing mode switching of a portable device according to an exemplary embodiment of the present invention.

The portable device may control a webpage region displayed on the external device through an upper/lower or left/right scroll operation or a pointer. This is called a navigation mode. If input interfaces are included in a webpage displayed on the external device, the portable device may be switched to a user input mode for receiving user input. Switching from the navigation mode to the user input mode may be implemented by a trigger interface. A detailed description of the trigger interface will be given with reference to FIGS. 8A to 8D.

The portable device 13 switched to the user input mode may display input interfaces extracted from a corresponding webpage. The respective input interfaces may be displayed together with related information and may be enlarged at a given ratio.

Figure 7:
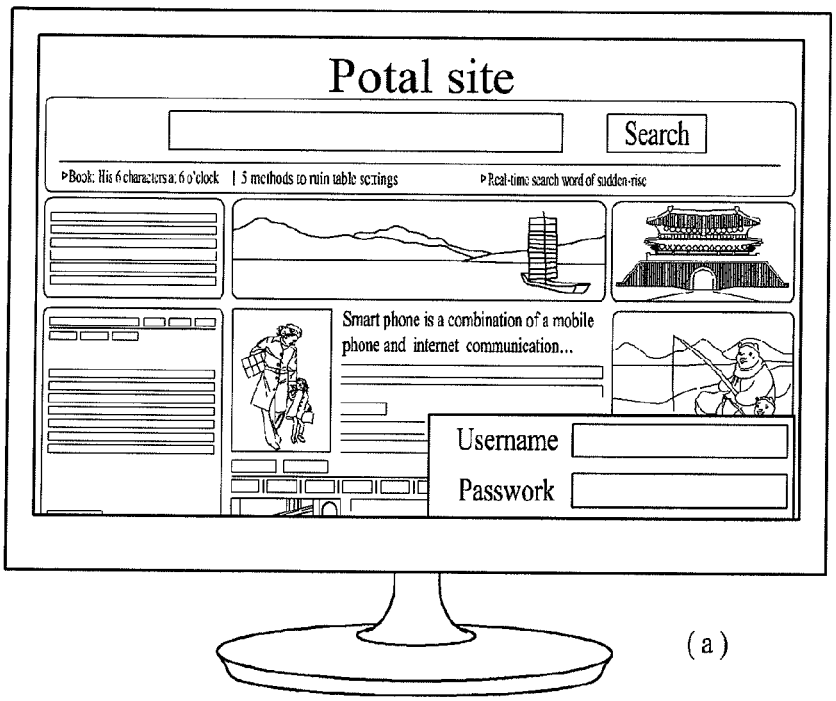
FIGS. 7A and 7B are diagrams showing execution of a user input mode of a portable device according to an exemplary embodiment of the present invention.
Figure 7:
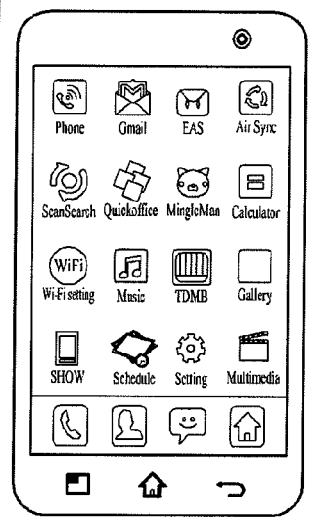
Figure 7:
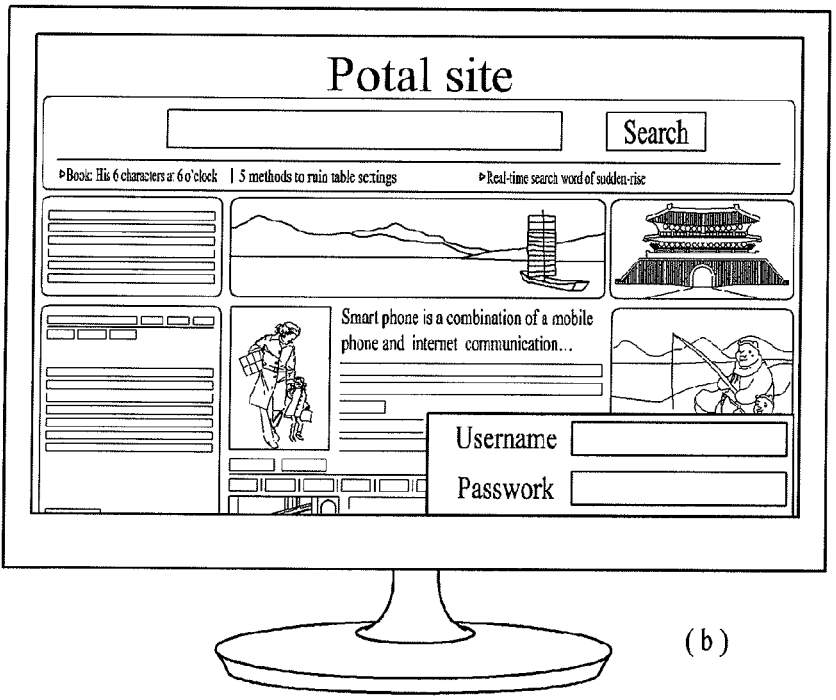
Figure 7:
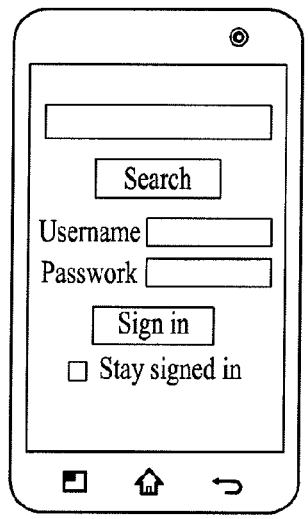

FIGS. 7A and 7B are diagrams showing execution of a user input mode of a portable device according to an exemplary embodiment of the present invention.

Figure 6:
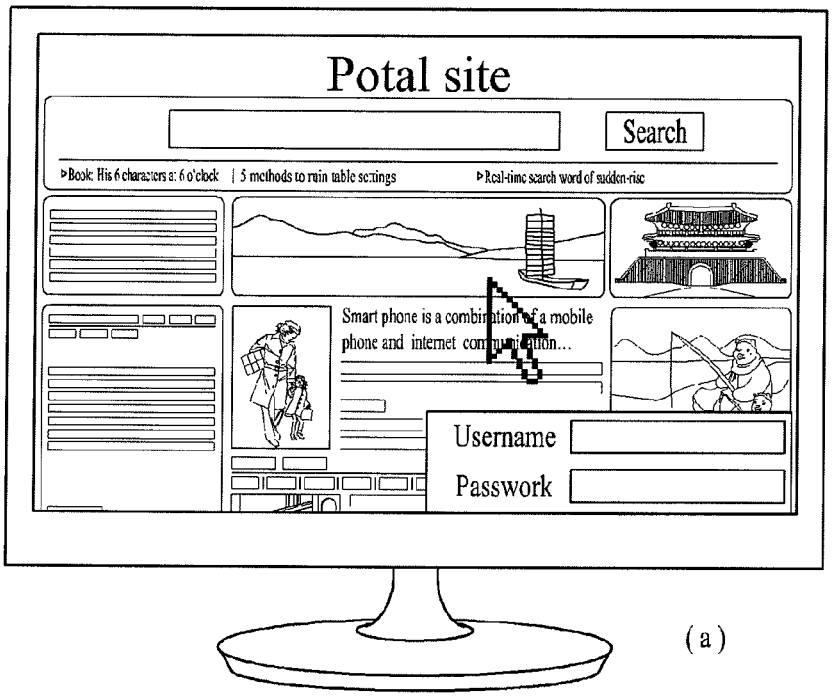
FIGS. 6A and 6B are diagrams showing mode switching of a portable device according to an exemplary embodiment of the present invention.
Figure 6:
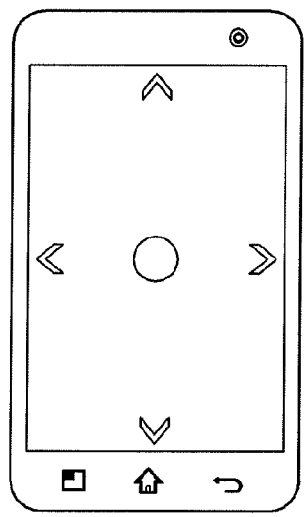
Figure 6:
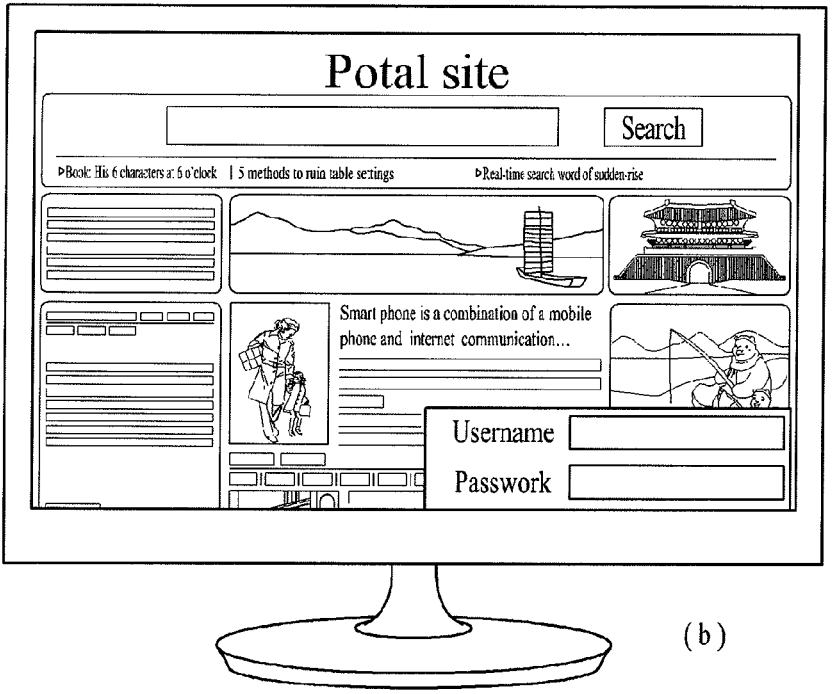
Figure 6:
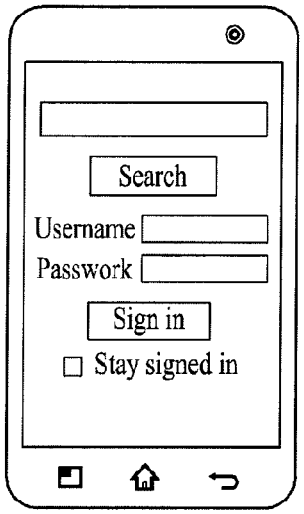

Although the portable device is switched from the navigation mode for the external device to the user input mode, it is possible to be switched from a standby mode to the user input mode as shown in FIG. 6. The standby mode refers to a state in which a background screen on which application icons are listed is displayed rather than a state in which a specific application is executed and displayed on the portable device.

If the external device displays a webpage on which input interfaces demanding user input are present while a user surfs webpages, the portable device may be switched from the standby mode to the user input mode so that the user can input text in the input interfaces. If a mode switching command to the user input mode is received through a trigger interface, the portable device is switched from the standby mode to the user input mode to display input interfaces and receives user input. Accordingly, the portable device may directly be switched to the user input mode from the standby mode even if it is not in the navigation mode for controlling the external device so that a user can input text in the input interfaces included in the webpage displayed on the external device.

Although the navigation mode and the standby mode has been described by way of example in FIGS. 6A, 6B, 7A, and 7B, the portable device of the present invention is not limited to switching from a specific mode to the user input mode. The portable device 13 may be switched to the user input mode even while executing an application.

FIGS. 8A to 8D are diagrams showing user input trigger in a user input mode of a portable device according to an exemplary embodiment of the present invention.

As described with reference to FIGS. 6A to 7B, the portable device can be switched to the user input mode from a navigation mode in which a remote control operation for a display of the external device is performed or a scroll operation or a pointer shift operation for the corresponding display is performed, a standby mode, or an application execution screen. If a webpage displayed on the external device 11 includes input interfaces, the portable device 13 may display an indicator indicating that the portable device can be switched to the user input mode. In addition, the portable device may be switched to the user input mode for receiving user input through input interfaces by detecting user input for a mode switching. Hereinafter, user input for mode switching may be referred to as a trigger interface and the indicator may be displayed independently of the trigger interface.

Figure 8:
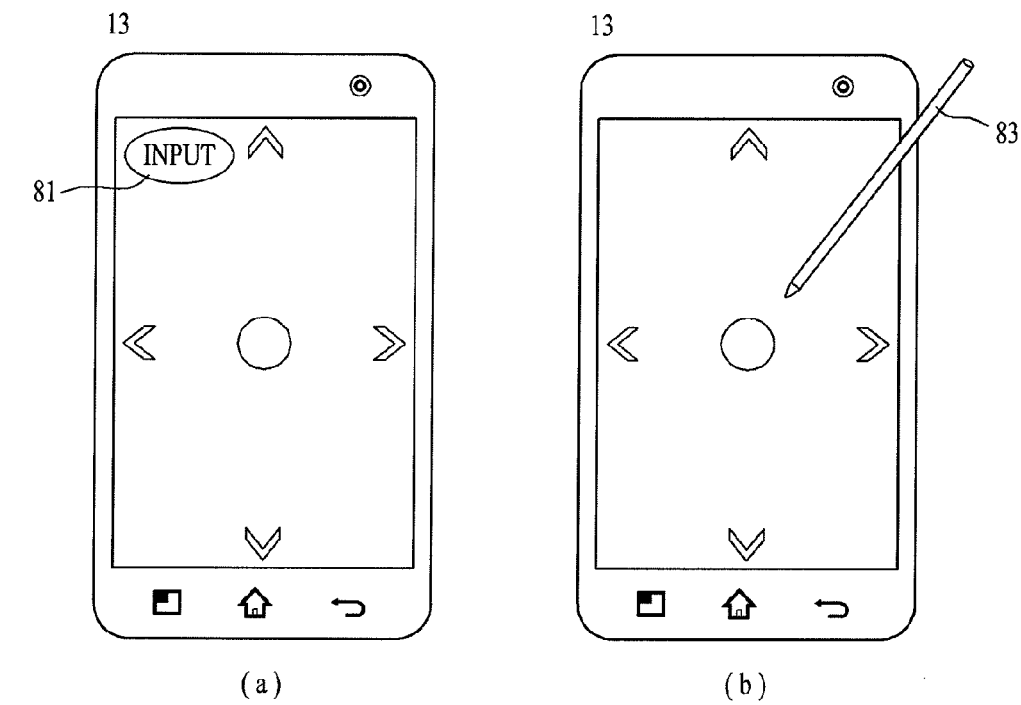
FIGS. 8A to 8D are diagrams showing user input trigger in a user input mode of a portable device according to an exemplary embodiment of the present invention.
Figure 8:
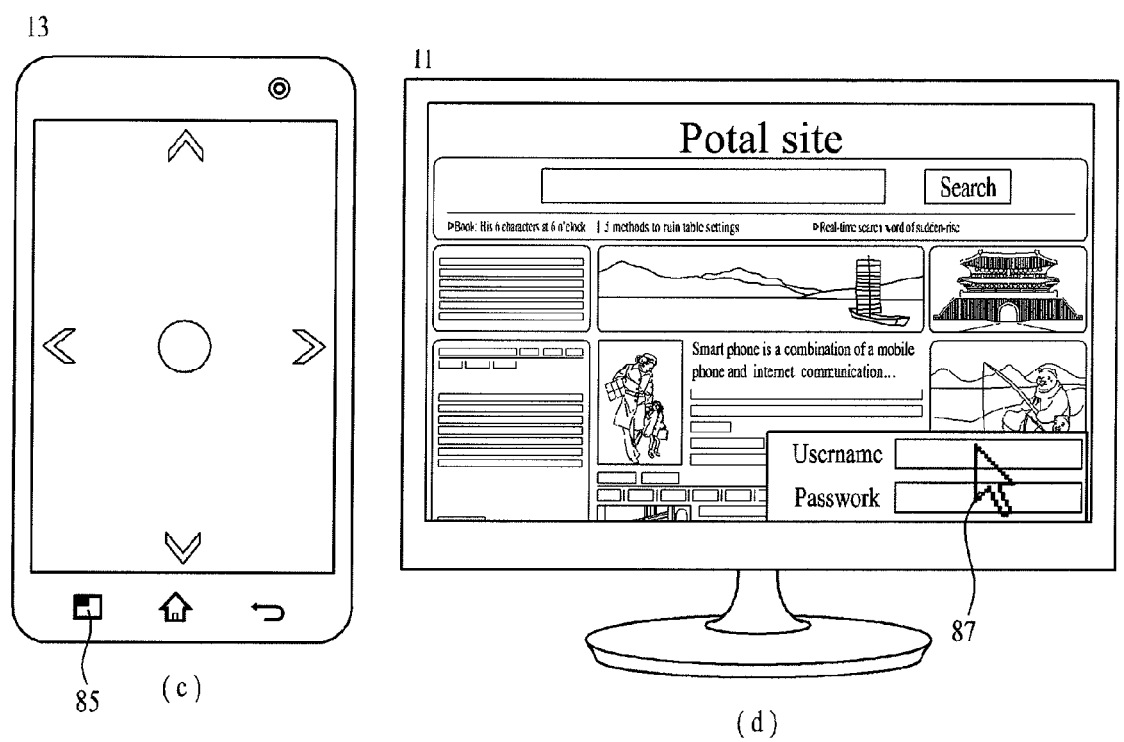

FIG. 8A shows an embodiment of an indicator indicating that the portable device can be switched to a user input mode, and a trigger interface, wherein the indicator and trigger interface are displayed on a touch screen. In this embodiment, the indicator and the trigger interface may use the same screen region 81. The portable device 13 may provide the indicator and the trigger interface by displaying images or text which are capable of receiving a touch input on a display thereof. If input interfaces are included in a webpage displayed on the external device, the portable device may display the screen region for mode switching on a partial or whole region of the touch screen. Upon detecting an input on the screen region 81, the portable device 13 may be switched to the user input mode to receive user input.

FIG. 8B shows another embodiment of the trigger interface. A stylus pen 83 is used for the trigger interface. Upon receiving an input using the stylus pen 83, the portable device 13 may be switched to the user input mode. The input using the stylus pen 83 may include touch for a specific pointer or behavior of drawing characters or shapes.

FIG. 8C shows still another embodiment of the trigger interface. A hardware interface 85 is used for the trigger interface. For example, the portable device may be switched to the user input mode using a hardware button included therein. The hardware button may include a mechanical button or an electronic button installed in the portable device. The portable device may be switched to the user input mode by sensing behavior of simultaneously pressing one or more buttons.

FIG. 8D shows still another embodiment of the trigger interface. Mode switching is performed according to a location of a pointer 87 on a webpage displayed on the external device. If the pointer 87 is located near an input interface on the webpage displayed on the external device 11, the portable device may be switched to the user input mode.

In addition to the above-described methods, the portable device may use gesture recognition using a sensor, voice recognition, and image recognition using a camera, as the trigger interface. Upon detecting an input through the trigger interface, the portable device may be switched to the user input mode.

Figure 9:
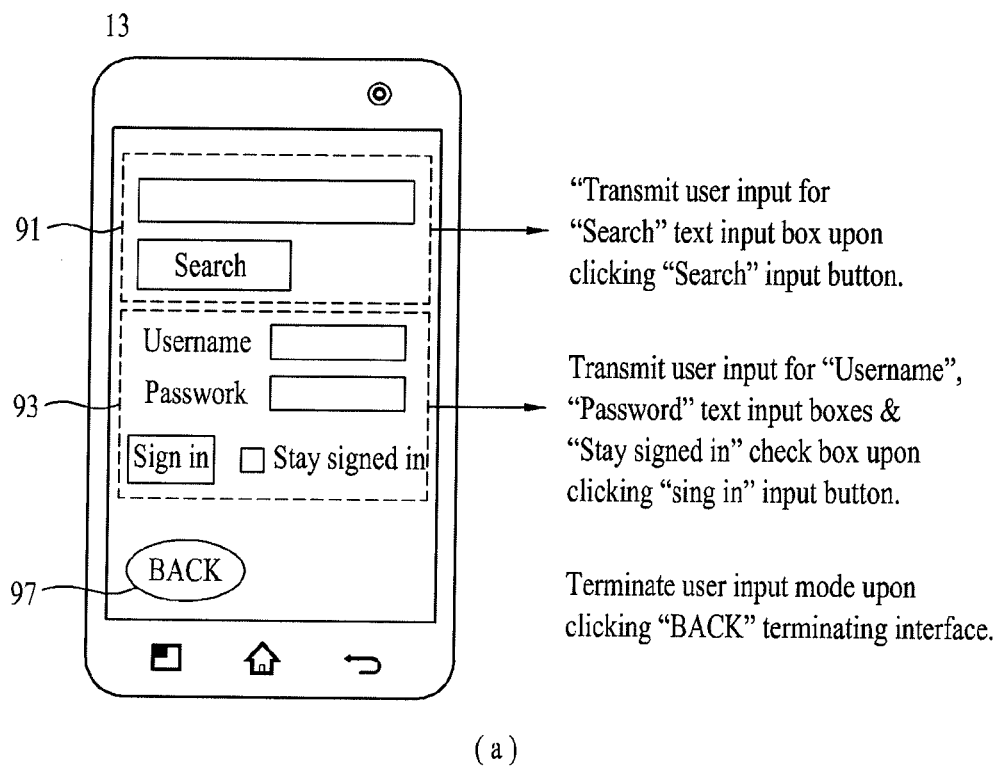
FIGS. 9A and 9B are showing a display screen of a user input mode according to an exemplary embodiment of the present invention.
Figure 9:
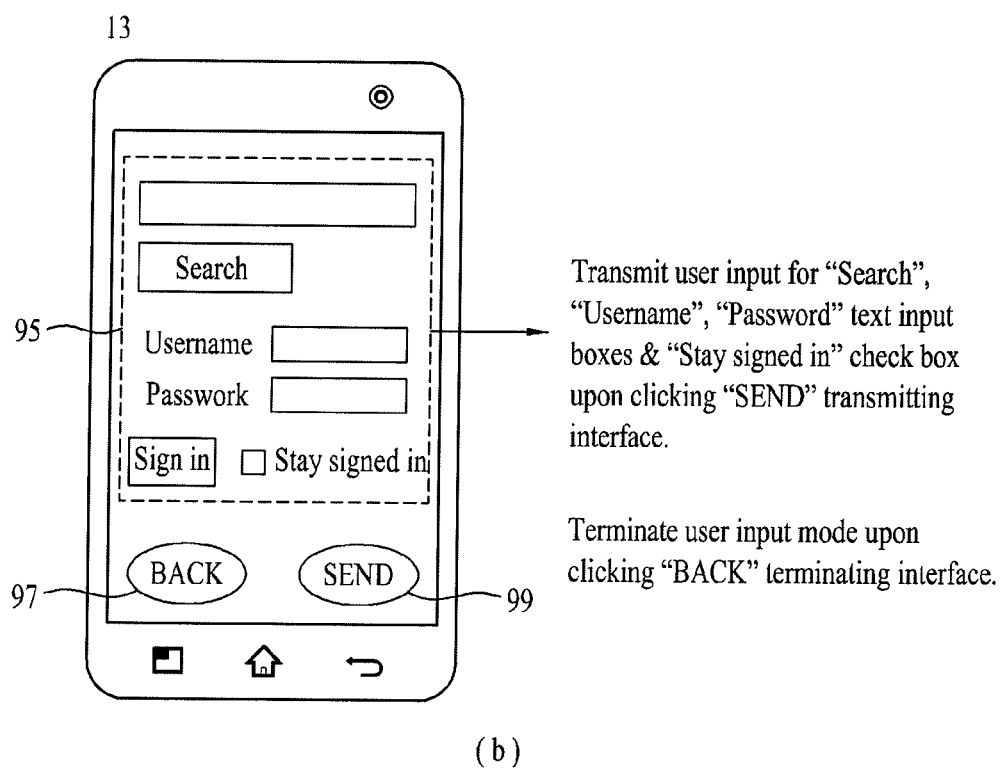

FIG. 9 is a diagram showing a display screen of a user input mode according to an exemplary embodiment of the present invention.

The portable device may provide input interfaces to a user by simultaneously displaying the input interfaces in a webpage displayed on the external device. In this case, both input interfaces having relevance to each other and input interfaces having no relevance to each other may be displayed. Here, input interfaces having relevance refer to input interfaces having the same purpose.

As shown in FIG. 9A, since a 'Search' text input box and a 'Search' input button have the same purpose for obtaining information for specific search text, they may be defined as a first group 91 having relevance. In addition, 'Username' and 'Password' text input boxes, a 'Sign in' input button, and a 'Stay signed in' checkbox which are used for a log-in purpose may be defined as a second group 93 having relevance. Namely, since the input interfaces of the first group 91 and the input interface of the second group 93 have purposes for different operations, the first and second groups 91 and 93 have no relevance. In this case, a user may input text only in partial input interfaces rather than all input interfaces. Accordingly, when the 'Search' input button included in the first group is clicked, the portable device may transmit user input of the 'Search' text input box of the same group to the external device. Further, when the 'Sign in' input button included in the second group is clicked, the portable device may transmit user input of the 'username' and 'password' text input boxes and 'Stay signed in' checkbox of the same group to the external device.

FIG. 9B shows the case where user input is received in input interfaces included in two or more groups having no relevance. As shown, if user input is received in the input interfaces included in two or more groups having no relevance, the portable device may define these groups as one new group 95. The portable device may additionally display a transmitting interface 99 and, upon receiving user input through the transmitting interface 99, may transmit the received user input in the input interfaces included in the new group 95 to the external device 11. The external device 11 may receive the user input and transmit the user input to a server in which a webpage is executed.

If an input button included in each individual group is used, the portable device transmits only information received through input interfaces included in a corresponding group. Moreover, the portable device may additionally display the transmitting interface 99 so that user input through input interfaces having no relevance can be simultaneously transmitted.

Upon transmitting information received through input interfaces included in two or more groups using the transmitting interface 99, the portable device may transmit information of a specific group first. For example, information of the first group 91 for search may be transmitted first and then information of the second group 93 for log-in may be transmitted or vice versa. A transmitted order may be determined by the portable device or by a request of a corresponding webpage.

In the user input mode, the portable device may display a terminating interface 97 for ending the user input mode and returning to a previous mode in addition to the above-described transmitting interface 99. The terminating interface 97 may be used when there is no user input after the user input mode is started or when a user desires to end the user input mode. Upon detecting an input of the terminating interface 97, the portable device 13 may terminate the user input mode and return to a previous mode. The previous mode may be the navigation mode, the standby mode, or an application execution screen described with reference to FIGS. 6A to 7B.

In addition to terminating the user input mode by receiving input for the terminating interface 97, the portable device may terminate the user input mode by receiving user input through an input interface and then receiving an execution command for an input button related to the corresponding input interface or by receiving user input for the transmitting interface 99 and then transmitting the user input. As described previously, the portable device 13 terminates the user input mode and may return to the navigation mode, the standby mode, or an application execution screen.

Figure 10:
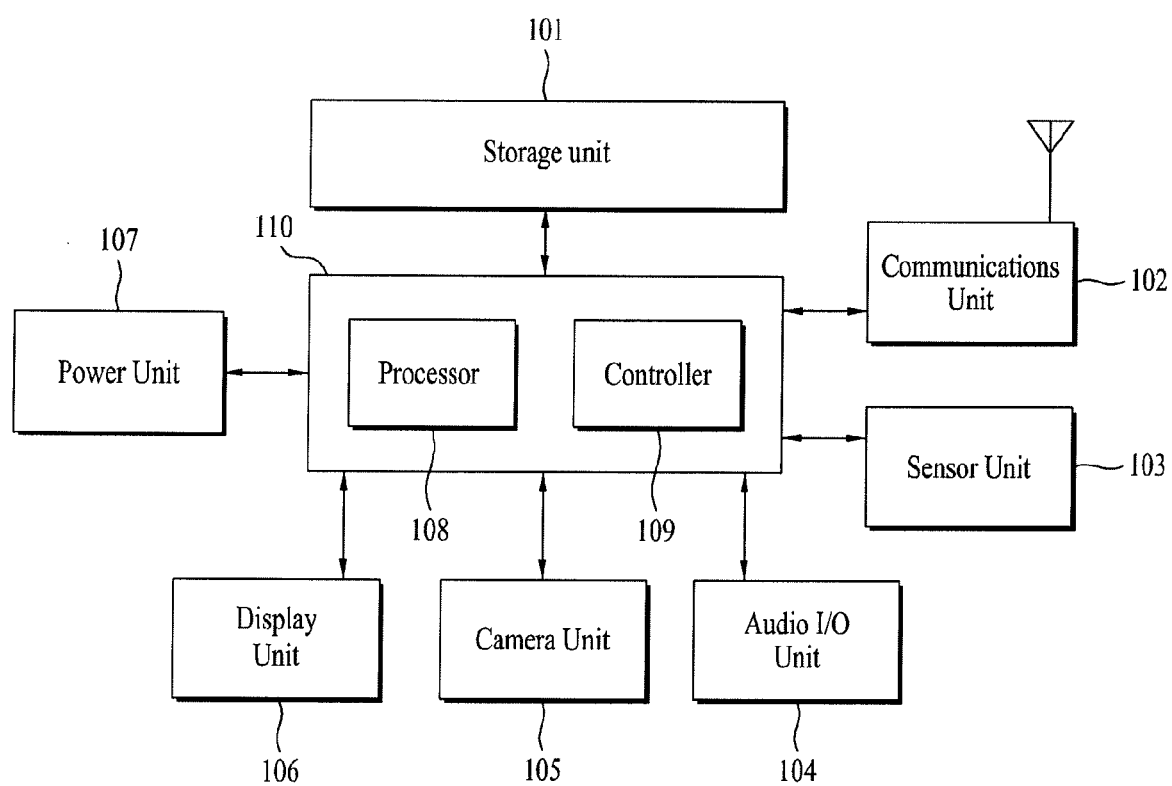
FIG. 10 is a block diagram showing a portable device according to an exemplary embodiment of the present invention.

FIG. 10 is a block diagram showing a portable device according to an exemplary embodiment of the present invention.

Referring to FIG. 10, the portable device includes a storage unit 101, a communication unit 102, a sensor unit 103, an audio input/output (I/O) unit 104, a camera unit 105, a display unit 106, a power unit 107, a processor 108, and a controller 109.

The storage unit 101 may store a variety of digital data such as video, audio, pictures, and moving images. The storage unit 101 indicates digital data storage spaces such as a flash memory, a Hard Disk Drive (HDD), and a Solid State Drive (SSD). In the portable device of the present invention, the storage unit 101 is optional.

The communication unit 102 may transmit and receive data by performing communication using various protocols with an external network of the portable device. The communication unit 102 may transmit and receive digital data by accessing the external network by wire or wirelessly.

The sensor unit 103 may transmit user input or an environment recognized by the device to the controller 109 by using a plurality of sensors installed in the portable device. The sensor unit 103 may include a plurality of sensing means. As an embodiment, the plurality of sensing means may include gravity sensors, geomagnetic sensors, motion sensors, gyro sensors, acceleration sensors, inclination sensors, brightness sensors, altimeter sensors, odor sensors, temperature sensors, depth sensors, pressure sensors, bending sensors, audio sensors, video sensors, Global Positioning System (GPS) sensors, touch sensors, etc. In the present invention, the sensor unit 103 may sense user input for controlling the external device or user input for initiating the user input mode or may receive user input to be input in input interfaces to transmit the user input to the controller 109. The sensor unit 103 refers to the above various sensing means and may transmit a sensed result by sensing a variety of user input and user environments so that the portable device can perform an operation according to the sensed result. The above-mentioned sensors may be included in the portable device as separate elements or may be incorporated into at least one element.

The audio I/O unit 104 may include an audio output means such as a speaker and an audio input means such as a microphone and may perform audio output of the device and audio input to the device. The audio I/O unit 104 may be used as an audio sensor. In the portable device of the present invention, the audio I/O unit may be an optional element.

The camera unit 105 may capture pictures and moving images and may be an optional element according to embodiments. The camera unit 105 may be used as a motion sensor or a visual sensor. In the present invention, the camera unit 105 may be used for image recognition which is one of trigger interfaces for initiating the user input mode. Upon recognizing a specific image, the camera unit 105 may initiate the user input mode. Upon recognizing a specific image, the camera unit 105 may initiate the user input mode. In the portable device of the present invention, the camera unit 105 may be optional.

The display unit 106 may output images on a display screen. In the case of a touch sensitive display, the display unit 106 may be used as the above-mentioned touch sensor. The display unit 106 may detect user input and transmit the detected user input to the controller 109. The display unit 106 may display images on a display panel or control image display. In the present invention, the display unit 106 may display an input interface extracted from content and provide the input interface to a user. The display unit 106 includes a flexible display.

The power unit 107 is a power source connected to a battery in the device or to an external power and may supply power to the device. In the portable device of the present invention, the power unit may be an optional element.

The processor 108 may execute various applications stored in the storage unit 101 and process data of the interior of the device.

The controller 109 may control the above-described units and manage transmission and reception of data between the units.

The processor 108 and the controller 109 may be incorporated into one chip 110 to perform the above operation. In this case, they may be referred to as the controller 109.

In the present invention, the controller 109 may extract input interfaces from content. For example, the controller 109 may extract input interfaces from content on a webpage and manage the display unit 106 to display the extracted input interfaces.

In a block diagram according to an exemplary embodiment of the present invention shown in FIG. 10, separate blocks are shown by logically distinguishing between elements of the portable device. The above-described elements of the device may be configured as one chip or plural chips according to design of the device.

Figure 11:
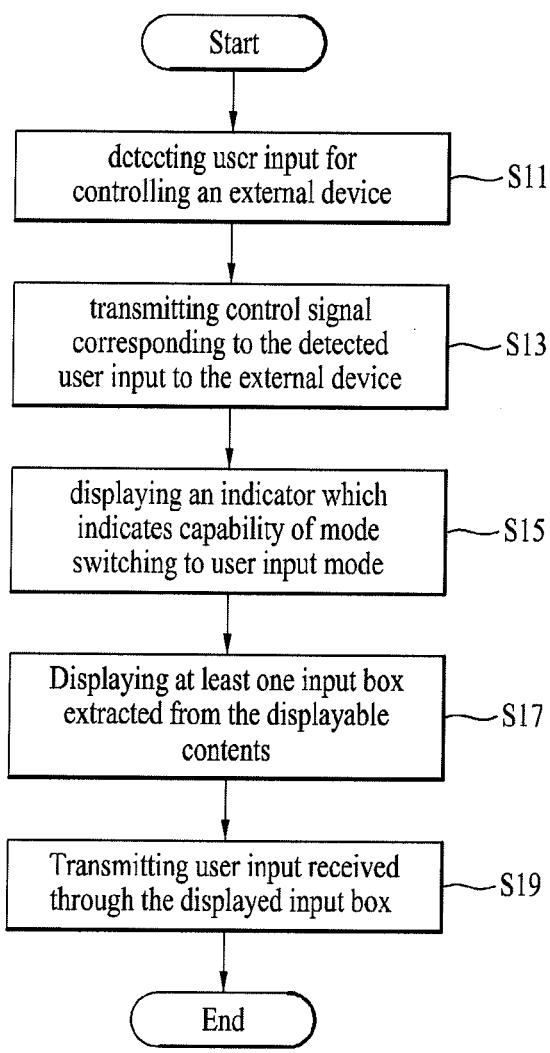
FIG. 11 is a flowchart showing a user input transmission/ reception method of a portable device according to an exemplary embodiment of the present invention.

FIG. 11 is a flowchart showing a user input transmission/reception method of a portable device according to an exemplary embodiment of the present invention.

The portable device detects user input for controlling an external device connected through a network while using a navigation mode, a standby mode, or other applications as described in FIGS. 6A to 7B (step S11). The input for controlling the external device may be varied according to content displayed on the external device.

The content which are displayable on the external device include content usable online or offline. For example, the content may include a webpage, video content, multimedia content, intranet content, and Internet content which include at least one input interface connected online. The displayable content may also include video content and multimedia content offline. Even when content do not include an input interface, if the input interface is included in a program or application for activating the corresponding content, the content may be the displayable content.

In the case of the webpage, intranet content, and Internet content, the user input may include a scroll operation of the corresponding webpage or content or a mouse pointer shift operation. The user input may also include a shift operation to the next or previous page. In the case of the video content and multimedia content, the user input may include an operation of playing, stopping, fast forwarding, or rewinding video or multimedia.

If the input interface is included within a program or application, the user input may include an operation of searching specific words in Internet Explorer or searching information about content from a multimedia player.

Upon detecting the user input, the portable device transmits a control signal corresponding to the detected user input to the external device (step S13). The control signal may be transmitted through a network connecting the portable device with the external device and may be transmitted through the communication unit included in the portable device.

If the displayable content includes an input interface, the portable device may display an indicator indicating that a mode is switchable and a trigger interface for activating a user input mode as described with reference to FIGS. 8A to 8D (step S15). The trigger interface may be activated when at least one input interface is included in a region displayed on the external device. The trigger interface may be activated even when at least one input interface is included in a region except the region in which a webpage or content are displayed although the input interface is not included in the region displayed on the external device. In other words, even though the input interface is not present on a currently displayed screen region, if the input interface is present in a region which can be displayed by a scroll operation of the corresponding screen, the trigger interface may be displayed even before the corresponding input interface is displayed by a scroll operation.

The step of activating the trigger interface may be performed such that the portable device displays the trigger interface when it is judged that an input interface is present as a result of analyzing, at the portable device, displayable content or such that the external device analyzes content displayed thereon and informs the portable device of information indicating the presence of the input interface and the portable device receives the information and displays the trigger interface. Alternatively, while displaying the trigger interface, the portable device may activate the trigger interface only when the input interface is present, and otherwise, may inactivate the trigger interfaces.

Upon sensing an input on the displayed trigger interface, the portable device displays at least one input interface extracted from displayable content to start a user input mode (step S17). The input interface is included in a webpage or content and an entity extracting the input interface may vary according to embodiments.

If the input interface is extracted by the portable device, the portable device analyzes data for displayable content received from the external device and extracts and displays only the input interface from the data. Information about the input interface may also be displayed.

If the input interface is extracted by the external device, the external device extracts data for the input interface included in the displayable content and transmits the data for the input interface to the portable device. The data about the input interface may further include information about the input interface in addition to the input interface. The portable device may display the data for the input interface transmitted by the external device so as to be provided to a user As described with reference to FIGS. 3A to 4B, the portable device may display the input interfaces extracted from a screen region displayed on the external device.

The portable device may determine priorities according to locations of input interfaces within content displayed on the external device. Namely, the portable device may assign different priorities to input interfaces displayed on a display of the external device and input interfaces which are not displayed. For example, the portable device may first display the input interfaces displayed on the external device on the display of the portable device and then may sequentially display the input interfaces which are not displayed on the external device. In addition, the portable device may display a virtual keyboard as an input tool together with the input interfaces.

Upon receiving an input through the displayed input interfaces, the portable device transmits the received input to the external device (step S19). As described with reference to FIGS. 9A and 9B, user input for input interfaces included in the same group are simultaneously transmitted. The received input is transmitted to the external device by clicking an input button displayed on a screen of the portable device or pressing an enter key after receiving input for an input interface. If two or more groups are present, only an input of one of the two groups may be transmitted or inputs of the two groups may be sequentially transmitted.

The user input mode may be ended by the terminating interface. The terminating interface may be displayed in the user input mode after the user input mode is initiated in the portable device. The terminating interface may be used when there is no user input or the user input mode is ended without any user input. Upon detecting input for the terminating interface, the portable device terminates the user input mode and returns to a previous state. The previous state may be a navigation mode, a standby mode, or an application execution screen.

The user input mode may also be terminated when the portable device receives input for an input interface and then clicking an input button related to the corresponding input interface or when the portable device transmits received input to the external device by detecting input for the transmitting interface.

According to the present invention, only an input interface included in content displayed on the external device can be selectively displayed on the portable device and can be provided to a user.

According to the present invention, an input interface displayed on the portable device can receive user input and the received user input can be transmitted to the external device.

According to the present invention, an input interface can be enlarged to be displayed on the portable device, so that accurate user input can be provided to users having poor sight.

According to the present invention, an unnecessary pointer shift operation used for an input interface in content displayed on the external device is minimized and user input can be conveniently provided.

According to the present invention, user input received through a plurality of input interfaces can be simultaneously transmitted to the external device using an additional transmitting interface.

It will be apparent to those skilled in the art that various modifications and variations can be made in the present invention. Thus, although the foregoing description has been described with reference to specific examples and embodiments, these are not intended to be exhaustive or to limit the invention to only those examples and embodiments specifically described.

As described above, the present invention is totally or partially applicable to electronic devices.

What is claimed is:

1. A method for receiving a user input of a display device, comprising:
   displaying a displayable content which includes at least one input box;
   receiving a control signal corresponding to a navigating input from a portable device, wherein the portable device is connected with the display device and the navigating input is for navigating the displayable content;
   transmitting the input box to the portable device, wherein the input box is displayed in the portable device when a mode switching input is detected by the portable device and the input box is extracted from the displayable content; and
   receiving a user input from the portable device wherein the user input is inputted in the transmitted input box,
   wherein the input box is sequentially displayed in the portable device corresponding to priority and the priority of each input box depends on the position of the input box in the displayable content.

2. The method of claim 1, wherein the input box is extracted from the displayed area of the displayable content.

3. The method of claim 2, wherein the input box is further extracted from a non-displayed area of the displayable content.

4. The method of claim 1, wherein the input box is extracted with a title of the input box.

5. The method of claim 1, further comprising:
detecting a location of a pointer, wherein the input box is extracted after detecting the pointer moved to the displayed input box.

6. The method of claim 1, wherein the display device includes a television, a monitor, or a projector.

7. The method of claim 1, wherein the display device is connected with the portable device using a wireless network.

8. The method of claim 1, wherein the displayable content includes a webpage, a video content, a multimedia content, or an internet content.

9. The method of claim 1, wherein the input box includes a username input box, a password input box, or a search input box.

10. The method of claim 1, wherein the mode switching input changes the portable device to a user input mode.

11. A display device for receiving a user input, the display device comprising:
a display unit configured to display a displayable content which includes at least one input box;
a communications unit configured to communicate with a portable device; and
a controller in control of the above units, and configured to perform actions including:
receiving a control signal corresponding to a navigating input from the portable device, wherein the navigating input is for navigating the displayable content;
transmitting the input box to the portable device, wherein the input box is displayed in the portable device when a mode switching input is detected by the portable device and the input box is extracted from the displayable content; and
receiving a user input from the portable device wherein the user input is inputted in the transmitted input box,
wherein the input box is sequentially displayed in the portable device corresponding to priority and the priority of each input box depends on the position of the input box in the displayable content.

12. The display device of claim 11, wherein the input box is extracted from the displayed area of the displayable content.

13. The display device of claim 12, wherein the input box is further extracted from a non-displayed area of the displayable content.

14. The display device of claim 11, wherein the input box is extracted with a title of the input box.

15. The display device of claim 11, wherein the controller is further configured to detect a location of a pointer and the input box is extracted after detecting the pointer moved to the displayed input box.

16. The display device of claim 11, wherein the display device includes a television, a monitor, or a projector.

17. The display device of claim 11, wherein the display device is connected with the portable device using a wireless network.

18. The display device of claim 11, wherein the displayable content includes a webpage, a video content, a multimedia content, or an internet content.

19. The display device of claim 11, wherein the input box includes a username input box, a password input box, or a search input box.

20. The display device of claim 11, wherein the mode switching input changes the portable device to a user input mode.

* * * * *